(12) United States Patent
Minowa et al.

(10) Patent No.: US 6,622,079 B2
(45) Date of Patent: *Sep. 16, 2003

(54) VEHICLE, AND APPARATUS FOR AND METHOD OF CONTROLLING TRAVELING OF THE VEHICLE

(75) Inventors: Toshimichi Minowa, Mito (JP); Kozo Nakamura, Hitachiohta (JP); Hiroshi Takenaga, Tokai-mura (JP); Yoshinori Endo, Mito (JP); Hiroto Morizane, Hitachi (JP); Tokuji Yoshikawa, Hitachi (JP); Mitsuru Nakamura, Hitachinaka (JP); Ryoichi Komuro, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/079,910

(22) Filed: Feb. 22, 2002

(65) Prior Publication Data

US 2002/0095255 A1 Jul. 18, 2002

Related U.S. Application Data

(63) Continuation of application No. 09/463,743, filed as application No. PCT/JP98/05438 on Dec. 2, 1998, now Pat. No. 6,385,529.

(30) Foreign Application Priority Data

May 11, 1998 (JP) .......................................... 10-127060

(51) Int. Cl.$^7$ .................................................. G06F 7/00
(52) U.S. Cl. ........................................ 701/96; 701/300
(58) Field of Search .............................. 701/96, 93, 70, 701/300, 65, 111; 180/167, 168, 169, 170–178

(56) References Cited

U.S. PATENT DOCUMENTS

| 5,902,345 | A | * | 5/1999 | Minowa et al. ............... 701/96 |
| 6,009,368 | A | * | 12/1999 | Labuhn et al. ............... 701/96 |
| 6,044,321 | A | * | 3/2000 | Nakamura et al. ........... 701/96 |
| 6,058,347 | A | * | 5/2000 | Yamamura et al. .......... 701/96 |
| 6,385,529 | B1 | * | 5/2002 | Minowa et al. ............... 701/96 |

FOREIGN PATENT DOCUMENTS

| EP | 0 145 989 | * | 6/1985 | .................. 701/96 |
| JP | 360019208 | * | 1/1985 | .................. 701/96 |

* cited by examiner

*Primary Examiner*—Richard M. Camby
(74) *Attorney, Agent, or Firm*—Crowell & Moring LLP (57) ABSTRACT

A method comprising a first traveling mode in which the traveling environment ahead is recognized and at least one of the engine, the speed change gear, and the brake is controlled on the basis of a signal representing the recognition and a second traveling mode in which at least one of the engine, the speed change gear, and the brake is controlled on the basis of a signal generated by operation of the driver, in which the second traveling mode is selected in an area where vehicle following-up control is difficult.

15 Claims, 13 Drawing Sheets

● : NEXT POINT

○ : PRESENT POINT

--- : COURSE

| ENVIRONMENT \ KIND OF VEHICLE | LIGHT CAR | ORDINARY CAR | TRUCK |
|---|---|---|---|
| FINE | 1.0 (1.1) | 1.0 (1.1) | 1.0 (1.1) |
| RAINY | 1.3 (1.5) | 1.6 (1.8) | 2.0 (2.5) |
| SNOWING | 0 (0) | 0 (0) | 0 (0) |
| VEHICLE ENCOUNTERING ACCIDENT | 1.1 (1.2) | 1.3 (1.4) | 1.5 (1.6) |
| DESCENT | 1.2 (1.3) | 1.4 (1.6) | 1.6 (2.0) |
| ASCENT | 1.1 (1.2) | 1.3 (1.4) | 1.5 (1.6) |
| CORNER | 1.2 (1.3) | 1.4 (1.5) | 1.6 (2.0) |

VEHICLE, AND APPARATUS FOR AND METHOD OF CONTROLLING TRAVELING OF THE VEHICLE

This application is a continuation of application Ser. No. 09/463,743, filed Jan. 31, 2000, now U.S. Pat. No. 6,385,529, which is a 371 of PCT/JP98/05438, filed Dec. 2, 1998.

TECHNICAL FIELD

The present invention relates to a vehicle, and an apparatus for and a method of controlling traveling of the vehicle. It more particularly relates to a vehicle controlling its traveling conditions and an apparatus for and a method of controlling the traveling, upon recognition of traveling environment ahead of the vehicle.

BACKGROUND ART

As a known art making it possible to change traveling conditions of an own vehicle according to traveling conditions of a vehicle in front or traveling conditions intended to produce by the driver, there is an art disclosed in the publication of Japanese Patent Laid-open No. Hei 7-47862.

In the publication, there is disclosed a method to select either allowing the vehicle to travel in conformity with the traveling conditions of a vehicle in front or allowing the vehicle to travel according to the intention of the driver by switching operation of the driver, whereby the traveling mode is switch-selected accordingly. The present invention is such that the switching between the above two traveling modes is left to driver's judgment so that traveling can be made according to the traveling mode intended by the driver.

According to the prior art, when the driver has erroneously switched the vehicle into the mode to follow-up a vehicle in front at a point to turn into or off a highway or an intersecting point and if there is no vehicle traveling in front, the vehicle is accelerated so as to reach a preset target vehicle speed and this tends to annoy the driver or unavoidably cause an accident.

Further it has been an important problem to establish a technology to secure safety of an own vehicle by detecting the distance between the own vehicle and a vehicle (including an obstacle) in front and the relative velocity therebetween. In the aforesaid technology, it is essential to unite achievement of traveling as intended by the driver (a satisfactory response of linear acceleration corresponding to the tread amount of the acceleration pedal) and insurance of safety (prevention of a collision). However, as far as traveling of vehicles is concerned, the areas where the mode of traveling mentioned first above is applicable are considerably limited as yet, i.e., it is applicable only on high ways, excepting toll houses and points for vehicles to turn into or off the high ways. However, switching between the aforesaid two traveling modes can only be made through the switching operation by the driver. In the event that an erroneous switching operation is made, it is unavoidable that unexpected acceleration or deceleration by the driver is produced or an accident takes place.

DISCLOSURE OF INVENTION

The present invention has as its object the provision of a vehicle capable, in an environment or an area where traveling control of a vehicle such as vehicle following-up control, of changing the traveling control (including stopping of the vehicle) to thereby prevent an accident to the vehicle, and an apparatus for and a method of controlling traveling of the vehicle.

The above object is achieved by a vehicle comprising: an engine; a brake; and a control apparatus; wherein the control apparatus controls the engine or the brake on the basis of the distance from a vehicle in front, and an own vehicle on this side, while the same is in an area, changes the mode of the control.

Further, the above object is achieved by a vehicle comprising: an engine; a brake; and a control apparatus; wherein the control apparatus controls the engine or the brake on the basis of the distance from a vehicle in front, and an own vehicle changes the mode of the control on the basis of information about the road ahead of the own vehicle.

Further, the above object is achieved by a vehicle travel controlling apparatus mounted on a vehicle for controlling an engine or a brake of the vehicle on the basis of the distance from a vehicle in front and changing the mode of the control when the vehicle has reached an area.

Further, the above object is achieved by a vehicle travel controlling apparatus mounted on a vehicle for controlling an engine or a brake of the vehicle on the basis of the distance from a vehicle in front and changing the mode of the control on the basis of information about the road ahead of the vehicle.

Further, the above object is achieved by a vehicle travel controlling apparatus comprising: control means for controlling at least one of an engine, a speed change gear, and a brake on the basis of a recognition signal of the traveling environment ahead of a vehicle; map storage means for storing map information; current position detection means for detecting the current position of the vehicle; and stop means for stopping the control means when it is known that the vehicle has reached an area according to the map information and the current position.

The above object is achieved by a vehicle travel controlling apparatus comprising: a first traveling mode controlling at least one of an engine, a speed change gear, and a brake on the basis of a recognition signal of the traveling environment ahead of a vehicle; a second traveling mode controlling at least one of the engine, the speed change gear, and the brake on the basis of a signal generated by operation of the driver of the vehicle; mode switching means for selecting and carrying out either of the two traveling modes; map storage means for storing map information; and current position detection means for detecting the current position of the vehicle; characterized in that the mode switching means selects the second traveling mode when it is known that the vehicle has reached an area according to the map information and the current position.

Further the above object is achieved by a vehicle travel controlling method of recognizing the traveling environment ahead of a vehicle and controlling at least one of an engine, a speed change gear, and a brake on the basis of the recognition, the vehicle travel controlling method comprising the steps of: detecting the current position of the vehicle; and stopping the control when it is known that the vehicle has reached an area according to map information in storage and the current position.

Further the above object is achieved by a vehicle travel controlling method of selecting and executing either a first traveling mode in which the traveling environment ahead of a vehicle is recognized and at least one of an engine, a speed change gear, and a brake is controlled on the basis of the recognition or a second mode in which at least one of the engine, the speed change gear, and the brake is controlled on the basis of a signal generated by operation of the driver in the vehicle, the vehicle travel controlling method characterized by comprising the steps of:

detecting the current position of the vehicle; and
selecting the second traveling mode when it is known that the vehicle has reached an area according to map information in storage and the current position.

BEST MODE FOR CARRYING OUT THE INVENTION

While an embodiment of a vehicle provided with an engine as the prime motor will be described in the present patent application, it is of course possible to apply the present invention to an electric car provided with an electric motor as the prime engine or a hybrid car provided with both an engine and an electric motor as the prime motor.

An embodiment according to the invention will be described with reference to the accompanying drawings.

Figure 1:
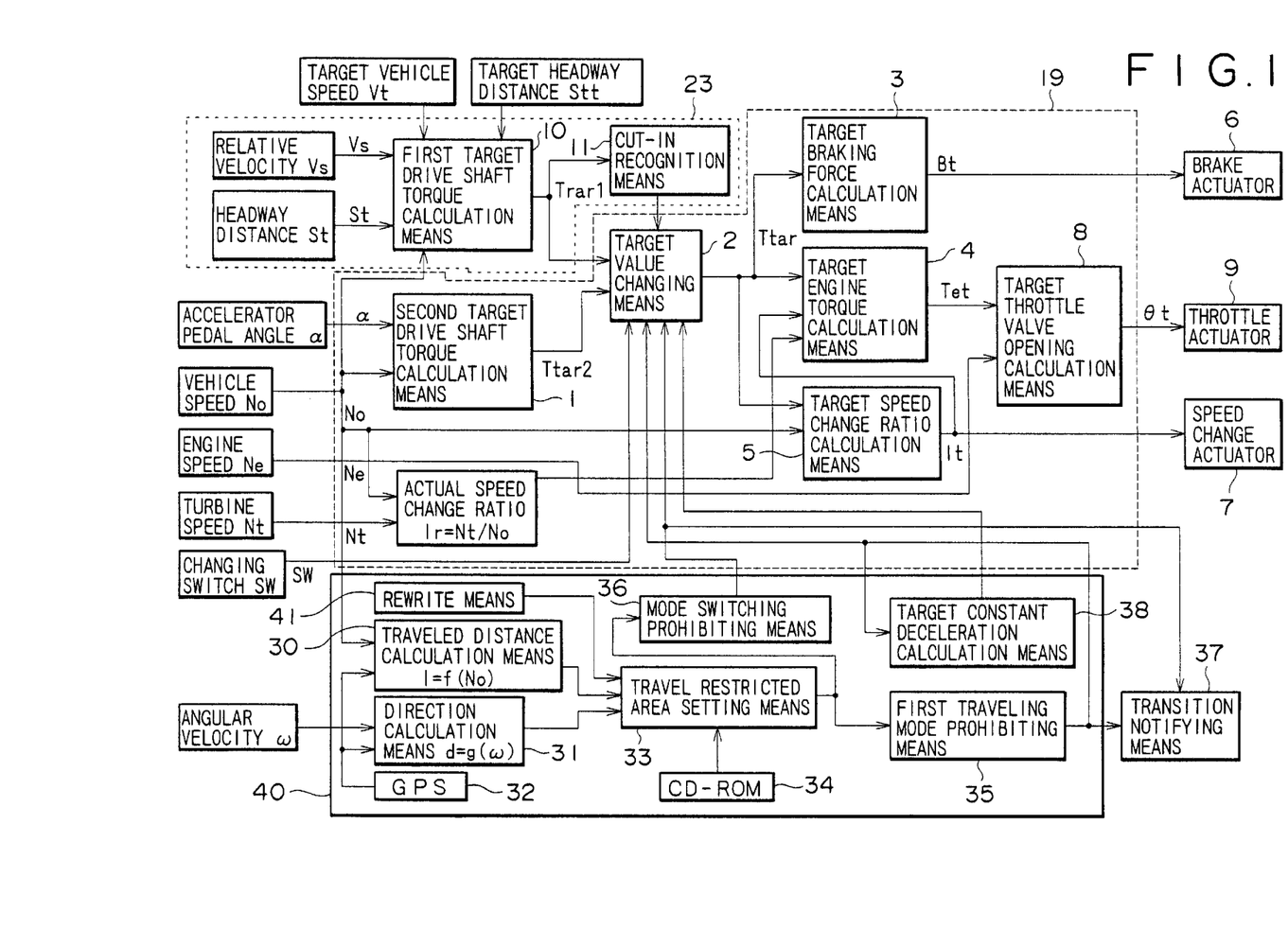
FIG. 1 is a block diagram of an embodiment of the present invention.
Figure 9:
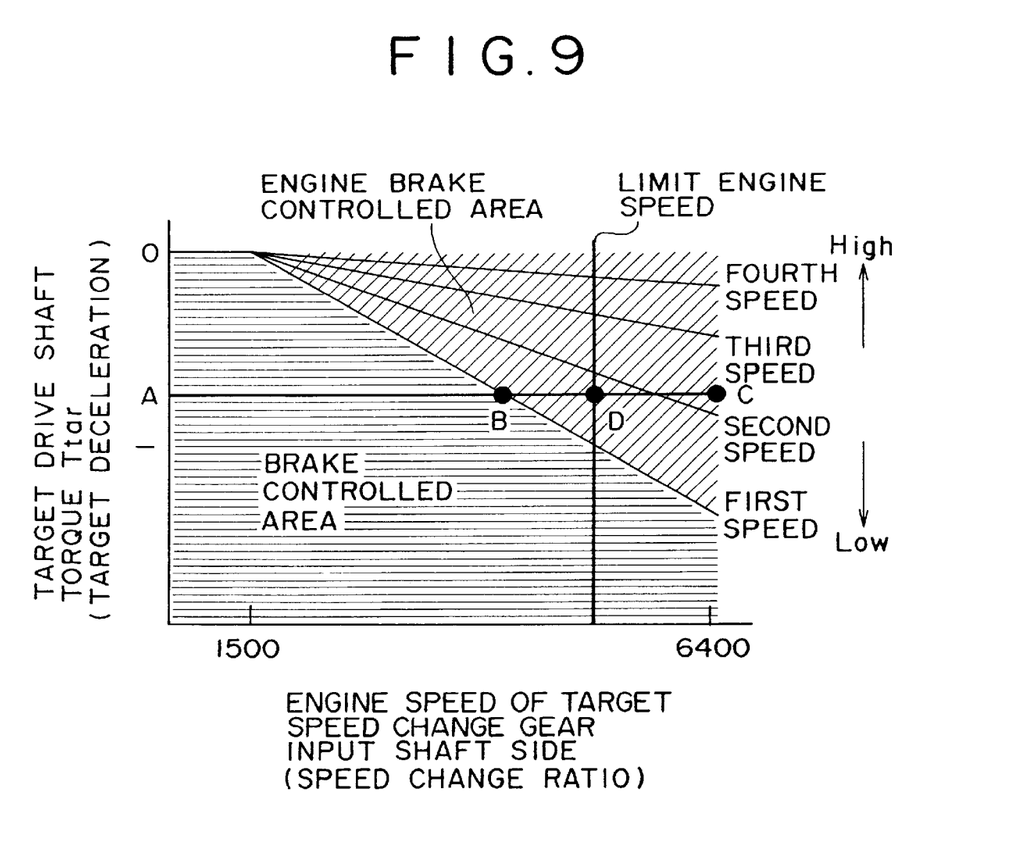
FIG. 9 is an explanatory drawing of an outline of transmission control at the time of deceleration.

FIG. 1 is a block diagram of an embodiment of the invention. First, control logic in a case where a vehicle (not shown) is run by a driver normally operating an acceleration pedal (not shown) will be described. An accelerator pedal angle α and a vehicle speed No are input to a second drive shaft torque calculation means 1 so that a second target value Ttar2 is calculated to be input to a target value changing means 2. From the target value changing means 2, the value Ttar2, as it is, is substituted for a value Ttar and this value Ttar is directly input to a target braking force calculation means 3, a target engine torque calculation means 4, and a target speed change ratio calculation means 5. In the calculation means 3, the brake-controlled region defined by the value Ttar and the target number of speeds of the speed change gear on the input shaft side shown in FIG. 9 is searched and thereby a target brake force Bt is calculated. This value Bt is input to a brake actuator 6 so that brake control is executed. In the calculation means 5, a target speed change ratio It is calculated with values Ttar and No at an accelerated state used as the parameters. Further, at the time of deceleration, the engine brake controlled region defined by the value Ttar and the target number of speeds of the speed change gear on the input shaft side shown in FIG. 9 is searched and thereby a target speed change ratio It is calculated. Such value It are input to a speed change actuator 7 and acceleration control and engine brake control are executed. Further, in the calculation means 4, a target engine torque Tet is calculated from the values Ttar, It, and an actual speed change ratio Ir to be input to a target throttle valve openingcalculation means 8. Then, the target throttle valve opening θt is calculated to be output to a throttle actuator 9. At this time, the value It is used for inertia correction control at the time of transient action so that torque variations at the time of acceleration and deceleration are suppressed.

Further, if the actual speed change ratio Ir as the ratio of the input axis number of speeds of the speed change gear Nt to the value No is used for calculation of the value Tet, the follow-up characteristic of the actual drive shaft torque to the value Ttar is improved and good torque control becomes possible. Further, the same result is obtained if the vehicle forward/backward acceleration and the driving force are used instead of the drive shaft torque. While brake control is used in the present embodiment, better acceleration and deceleration control than in the existing vehicles can be executed only by controlling the engine torque and the speed change ratio and, thereby, traveling as intended by the driver can be achieved. Although the above description was made as related to an engine of an inlet port injection type now prevalent, by the use of an engine of cylinder injection type, which is good in controllability, the air fuel ratio can be increased and, hence, by executing air-fuel ratio control in which the throttle control and the fuel quantity control are combined, the target engine torque can be attained and more precise drive shaft torque control becomes possible.

Now, control logic used when the driver wanted to change the traveling mode from the above described normal traveling mode to control by headway distance, by operating such a switch as the changing switch SW, will be described. When control by headway distance is requested, the relative velocity Vs between the vehicle and an object (vehicle or another) in front, headway distance St, target headway distance Stt, and the value No are input to a first target drive shaft torque calculation means 10 and a target acceleration/deceleration is calculated from the deviation between the value No and a target vehicle speed Vtt, which is calculated from the above values Vs, St, and Stt, and the time taken to reach the target vehicle speed, and, then, the first target value Ttar 1 is calculated from the vehicle weight, the tire radius, the acceleration of gravity, and the flat ground running resistance. Then, the value Ttar 1 is input as a parameter to a cut-in recognition means 11 and the changing means 1. For example, when the vehicle is safely following up a vehicle ahead, control of driving force at the time of normal traveling is exercised according to the value Ttar 1. On the other hand, in an emergency of another vehicle cutting in in front of the vehicle, the abrupt change of the Ttar 1 is recognized by the cut-in recognition means 11 and the mode is to automatically changed to the mode of control by headway distance. Thus, safety vehicle follow-up control can be realized.

Hereinafter, the system to control the power train depending on the first target drive shaft torque is called the first traveling mode and the system to control the power train depending on the second target drive shaft torque, the second running mode.

Now, the method to exercise automatic switching between the first traveling mode and the second traveling mode at a time not in an emergency as described above will be described. There are a great number of different road environments where the vehicle travels; the first traveling mode such as the vehicle follow-up control is allowed only in limited areas. By setting such traveling mode limited areas, safety at the time of the follow-up control mode can be secured. Here, a case where a navigation system is used will be described.

Figure 6:
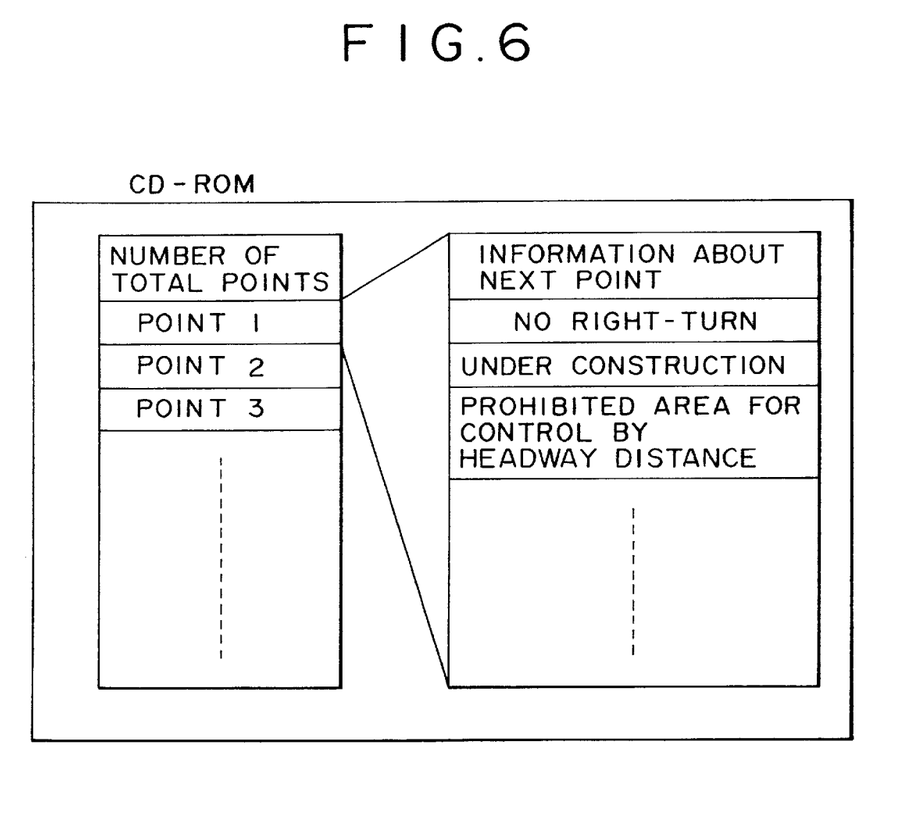
FIG. 6 is an explanatory drawing of CD-ROM data.
Figure 7:
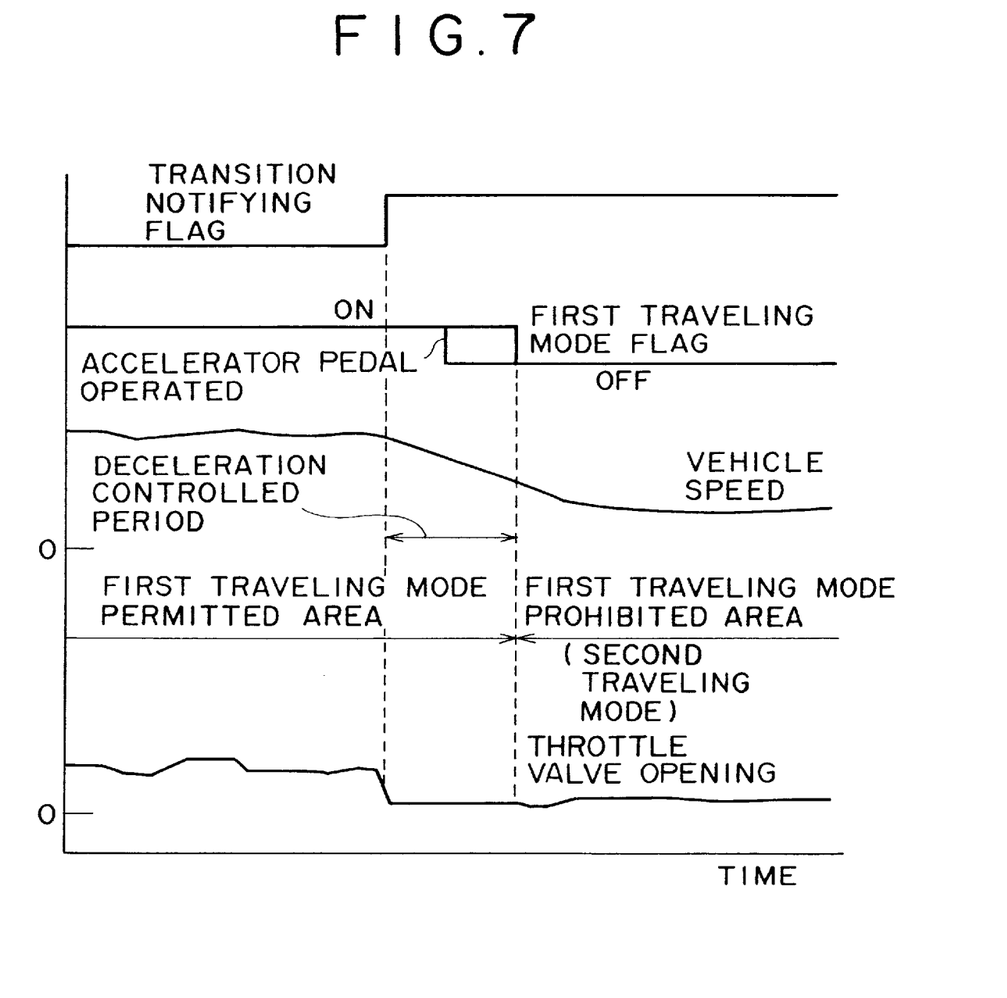
FIG. 7 is a drawing showing a time chart at the time when a vehicle shifted from a first traveling mode permitted area to a prohibited area.
Figure 8:
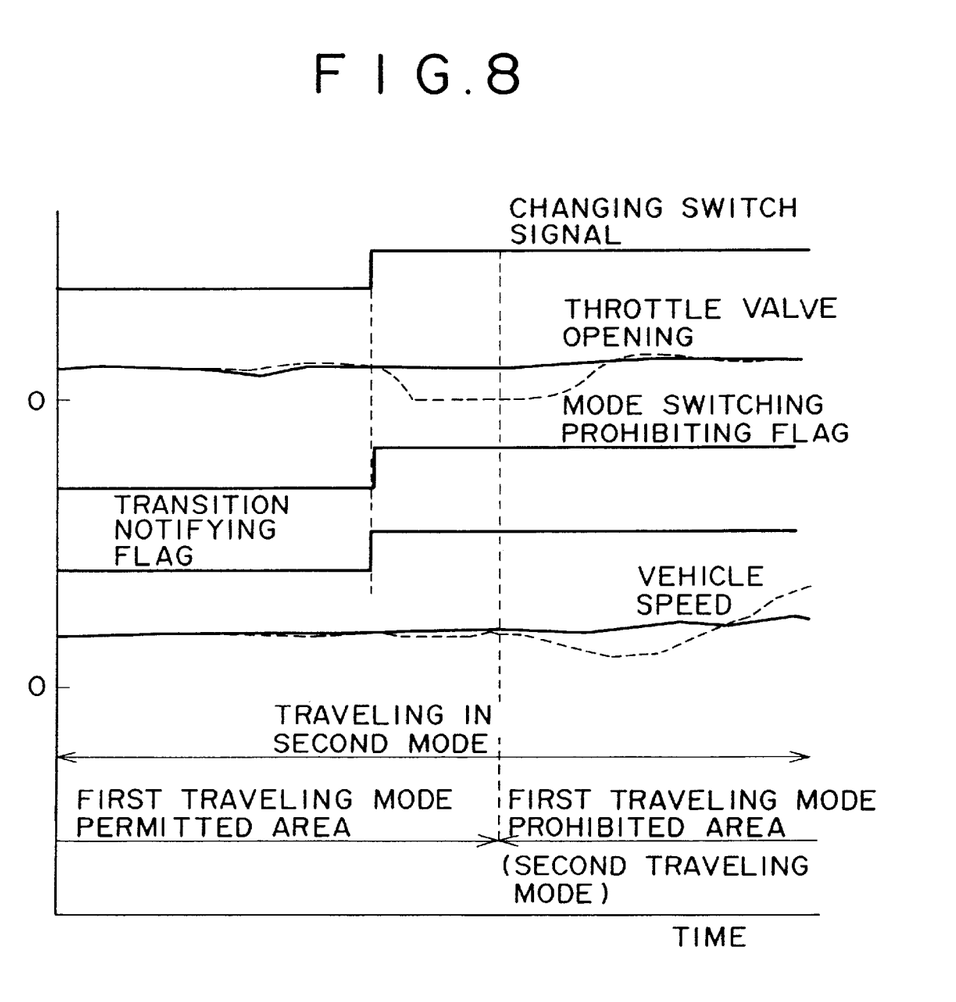
FIG. 8 is an explanatory drawing of a controlling method just in front of a vehicle following-up control prohibited area.
Figure 13:
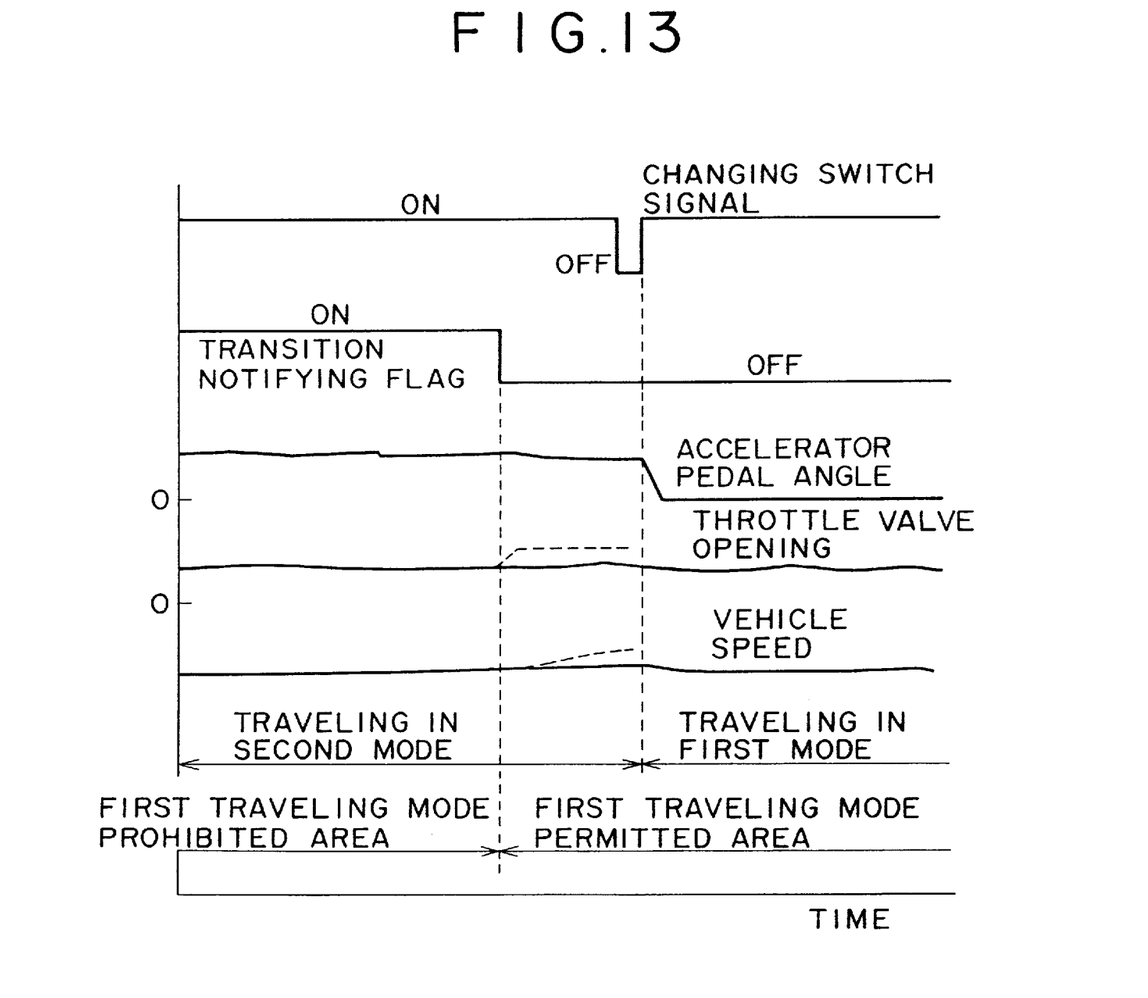
FIG. 13 is a drawing showing a time chart when a vehicle shifted from a first traveling mode prohibited area to a permit area.

First, the above No is input to a traveled distance calculation means 30 and the traveled distance l is calculated with a function f. In addition, an angular velocity ω is input to a direction calculation means 31 and the direction d is calculated with a function g. Accurate distance and direction from a GPS (Global Positioning System) 32 are respectively input to the distance calculating means 30 and the direction calculating means 31 to correct the above values l and d. Then, the values l and d, and, further, map information from a CD-ROM (Compact Disc-Read Only memory), which includes information about areas where control by headway distance is prohibited (FIG. 6), are input to a restricted area setting means 33. According to the signals, a traveling restricted area required for switching between the first traveling mode the second traveling mode is calculated. The data of the restricted area is input to a first traveling mode prohibiting means 35 and a mode switching prohibiting means 36. For example, in control logic exercised when the vehicle shifts from a first running mode permitted area to the first running mode prohibited area (where only the second traveling mode is allowed) as shown in FIG. 7, the mode of control must be switched over prior to the shifting to the first running mode prohibited area. This means that the driver must be notified, before making the switching, of the need for switching the traveling mode by means of a transition notice means 37. After the notice has been given, the vehicle is run a preset period of time or a preset distance at a constant deceleration so that the driver is made ready for making manual driving operation. This control is such that allows the target value changing means 2 to select the value calculated in a target constant deceleration calculation means 38 by using the signal from the mode prohibiting means 35 as a trigger signal to thereby control the power train. Thereby, the traveling mode switching being safe and comfortable for the driver can be achieved. If the accelerator pedal is treaded during the deceleration period of time, it is judged that the manual running is made ready and at once the first traveling mode is turned off. Operation of the mode switching prohibiting means 36 will be described with reference to FIG. 8. The operating state here exemplifies a case where the vehicle traveling a first traveling mode permitted area enters a first traveling mode prohibited area immediately after the driver has operated the changing switch SW. In such a traveling state, the vehicle follow-up control is exercised according to the switch operation, but then, since the driver returns the accelerator pedal to its original position as indicated by the broken line, the degree of the throttle valve opening is reduced and the vehicle speed is decreased. Then since the driver hastily treads on the accelerator pedal, it gives an unpleasant feeling to the driver. Therefore, if the vehicle is going to shift into a first running mode prohibited area soon when the above switch has been operated, the switching to the first running mode is prohibited by the mode switching prohibiting means 36 as indicated by the solid line and simultaneously the driver is notified of the fact that the switching to the first running mode cannot be made by means of the above transition notice means 37. Now control exercised when the vehicle shifts from a first traveling mode prohibited area to a first traveling mode permitted area will be described with reference to FIG. 13 (a time chart in the case where the vehicle shifts from a first running mode prohibited area to a first running mode permitted area). First, the changing switch SW and the transition notifying flag are in an on state in the first traveling mode prohibited area (while the vehicle is traveling in the second traveling mode). The ON state of the switch indicates that the first traveling mode will start upon turning OFF of the transition notifying flag, namely, that control by headway distance will soon be exercised. If, in this state, the first traveling mode is permitted, namely, the transition notifying flag is turned off, there is the possibility that the vehicle is suddenly accelerated or decelerated. This is a dangerous thing and frightens the driver (the broken lines in FIG. 13). Therefore, it is designed so that the first traveling mode is executed when the transition notifying flag is off and the driver has operated the switch SW to turn it on again. Accordingly, as shown in FIG. 13, the degree of the throttle valve opening is controlled so that the vehicle following up is performed even if the driver operates the accelerator pedal. In addition, when the transition notifying flag is turned off, such a voice message as "Reset the changing switch because control by headway distance (the first traveling mode) is permitted" is issued to the driver.

The above description applies to a case where information about the traveling restricted area is previously stored in the CD-ROM or the like. However, depending on various conditions, such as the road being under construction, changes in weather, and occurrence of natural disaster, real traveling environments always vary. Accordingly, signals from a rewrite means 41 for allowing the driver or a passenger to rewrite the traveling restricted area are input to the traveling restricted area setting means 33. In addition, the setting means 33 has a memory means (not shown) allowing rewriting of the traveling restricted area, so that writing in or erasing can be made by the above rewrite means 41. Communications signals from infrastructure (not shown) are being input to the rewrite means 41 and the above traveling restricted area can be set or erased also by the communications signals.

Figure 2:
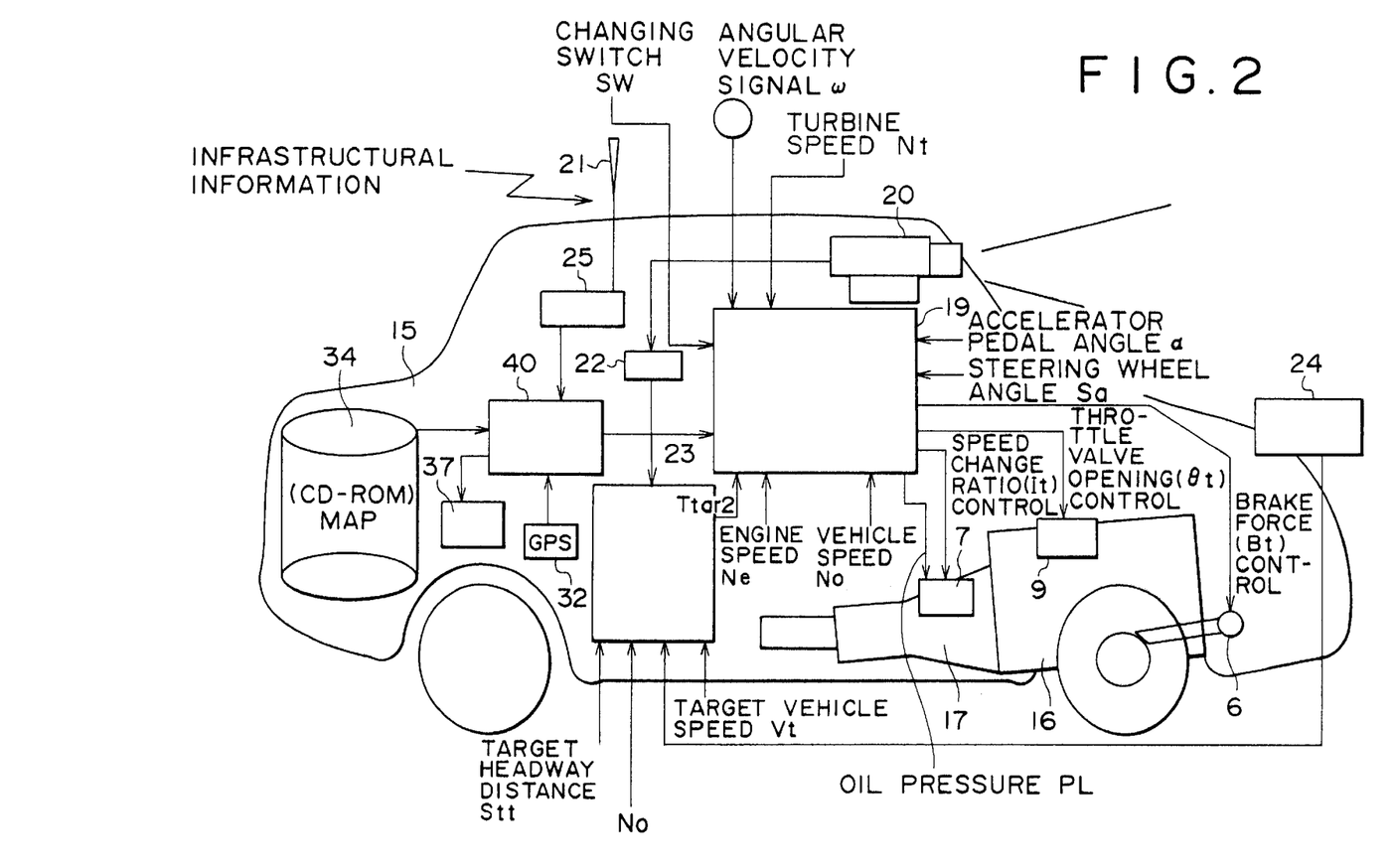
FIG. 2 is a system configuration diagram of the invention.

FIG. 2 illustrates the system configuration of the invention. An engine 16 and a speed change gear 17 are mounted on a vehicle body 15, and an engine power train control unit 19 controls the driving horsepower transmitted to a power train between the engine 16 and wheels 18. The control unit 19 calculates the second target drive shaft torque (driving force, acceleration/deceleration), and according to the thus calculated target value, target throttle valve opening θt (air flow rate), fuel quantity, ignition timing, brake pressure Bt, speed change ratio It, and transmission control oil pressure PL are calculated. For fuel control, a currently prevailing inlet port injection type or a cylinder injection type which is good in controllability is used. On the vehicle body 15, a TV camera 20 for detecting outer conditions and an antenna 21 for detecting infrastructural information are mounted. The images taken by the TV camera 20 are input to an image processing unit 22 to undergo image processing, and such things as the road gradient, the corner radius of curvature, information from signal units, and a road sign are recognized. The recognized traveling environmental signals are input to an environment-responsive power train control unit 23. A radar system 24 of the FM-CW type or the like is installed on the vehicle body 15 in the front to detect a distance St to a vehicle or an object ahead and the velocity Vs relative to it. The antenna 21 is connected to an infrastructural information terminal device 25 to set the vehicle follow-up control prohibited area, i.e., the first traveling mode restricted area according to the infrastructural information. The area signal is input to a traveling mode determination unit 40 and the power train is controlled based on the result of the determination. In addition, information from infrastructure contributes to detection of road conditions ahead (wet, dry, snow-covered, or sandy) and information of a traffic snarl and, further, enables calculation of the friction coefficient $\mu$ between the tire and the road depending on the road conditions. The traveling environments can also be determined from the map information stored in the CD-ROM 26 and the like so that road conditions ahead (the road gradient, the radius of corner curvature, etc.) can be detected. Also, setting of a traveling restricted area in the first traveling mode is possible. The control unit 23 calculates the first target drive shaft torque (driving force, acceleration/deceleration) of the power train depending on the traveling environments that the vehicle encounters in the future and inputs the value to the control unit 19. The control unit 19 selects the first target value, the second target one, or the target value calculated by the unit 40 according to a signal from the changing switch SW operated by the driver. When the first target value is selected, the throttle valve opening θt, fuel quantity, ignition timing, transmission control oil pressure PL, speed change ratio It, and brake force Bt are calculated based on the target drive shaft torque corresponding to the traveling environments. Further, into the control unit 19, such values as accelerator pedal angle α, vehicle speed No, turbine number of speeds Ne, and angular velocity sensor signal ω are input. On the vehicle, a display 37, as the above-described transition notifying means, and the GPS 32 are mounted.

Figure 3:
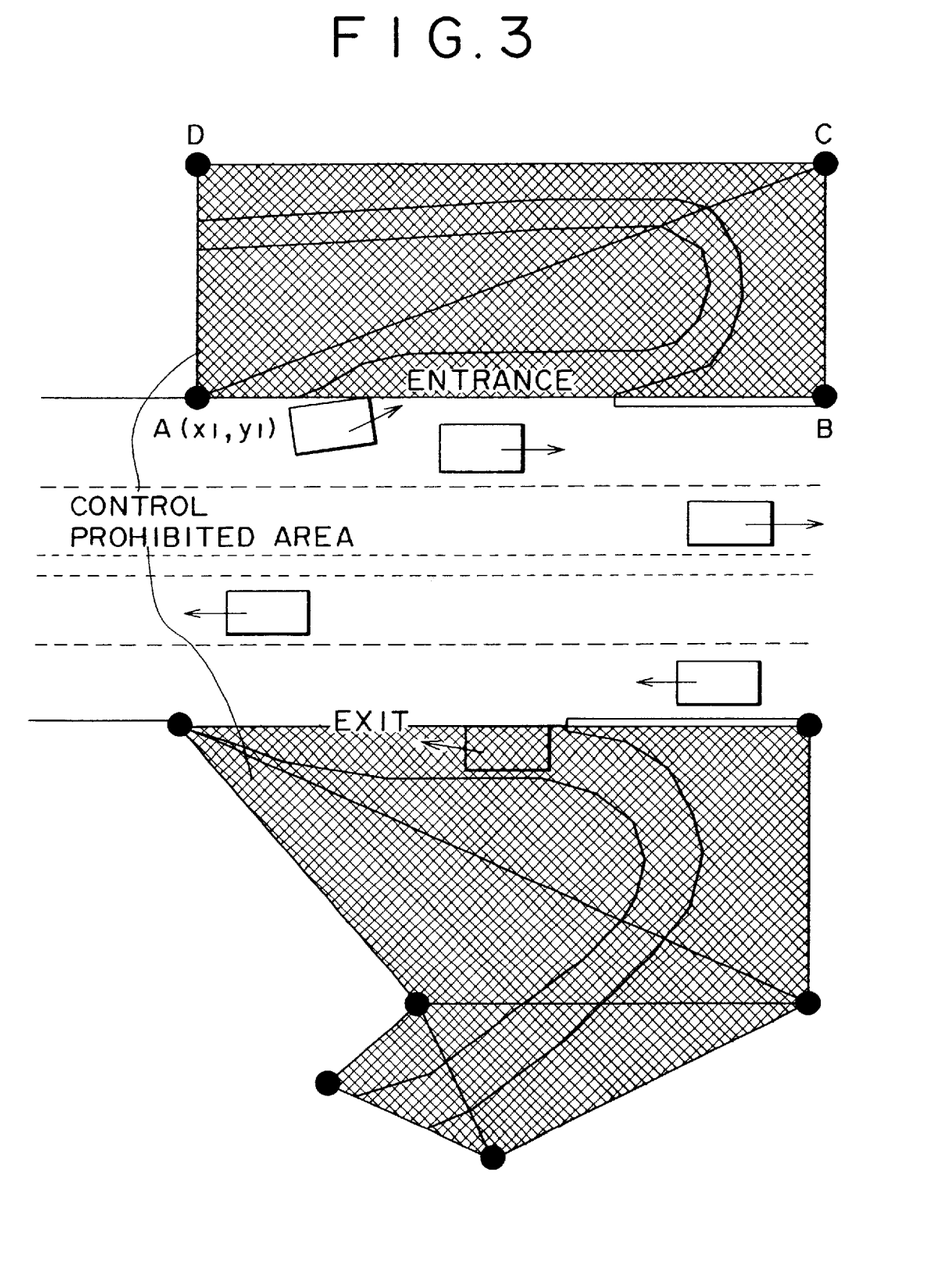
FIG. 3 is an explanatory drawing of an example of an area where control by headway distance is prohibited on a highway.
Figure 4:
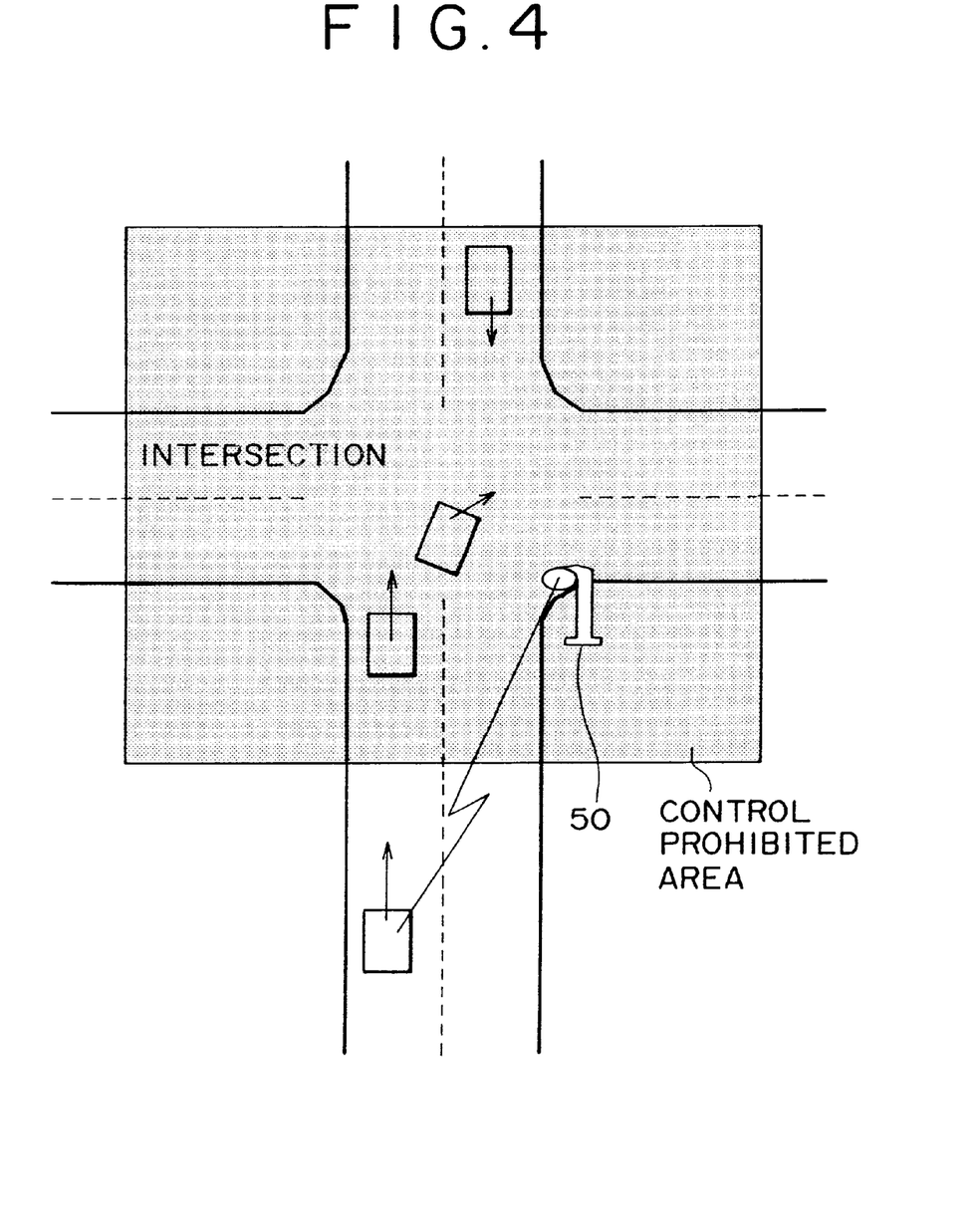
FIG. 4 is an explanatory drawing of an example of an area where control by headway distance is prohibited on an ordinary road.

FIGS. 3 and 4 illustrates an example of the vehicle follow-up control prohibited area to which the invention is carried out. FIG. 3 shows exit/entrance of a highway, and FIG. 4 shows an intersection. The half-tone dot meshed zones are vehicle follow-up control prohibited areas. The prohibited areas may be specified by an infrastructure 50 on the road side shown in FIG. 4. In FIG. 3, the traveling restricted area set in the setting means 33 corresponds the vehicle follow-up control prohibited area, which is represented at least by three coordinate points (A, B, C). Thus, the upper half-tone dot meshed zone in FIG. 3 is specified by the combination of the triangular area ABC and the triangular area ACD. Of course, it may be specified by one square area ABCD. In the lower portion of FIG. 3, there is shown a complicated area specified by a combination of several triangular areas. Also in this case, one polygon may be used to specify the area.

Figure 5:
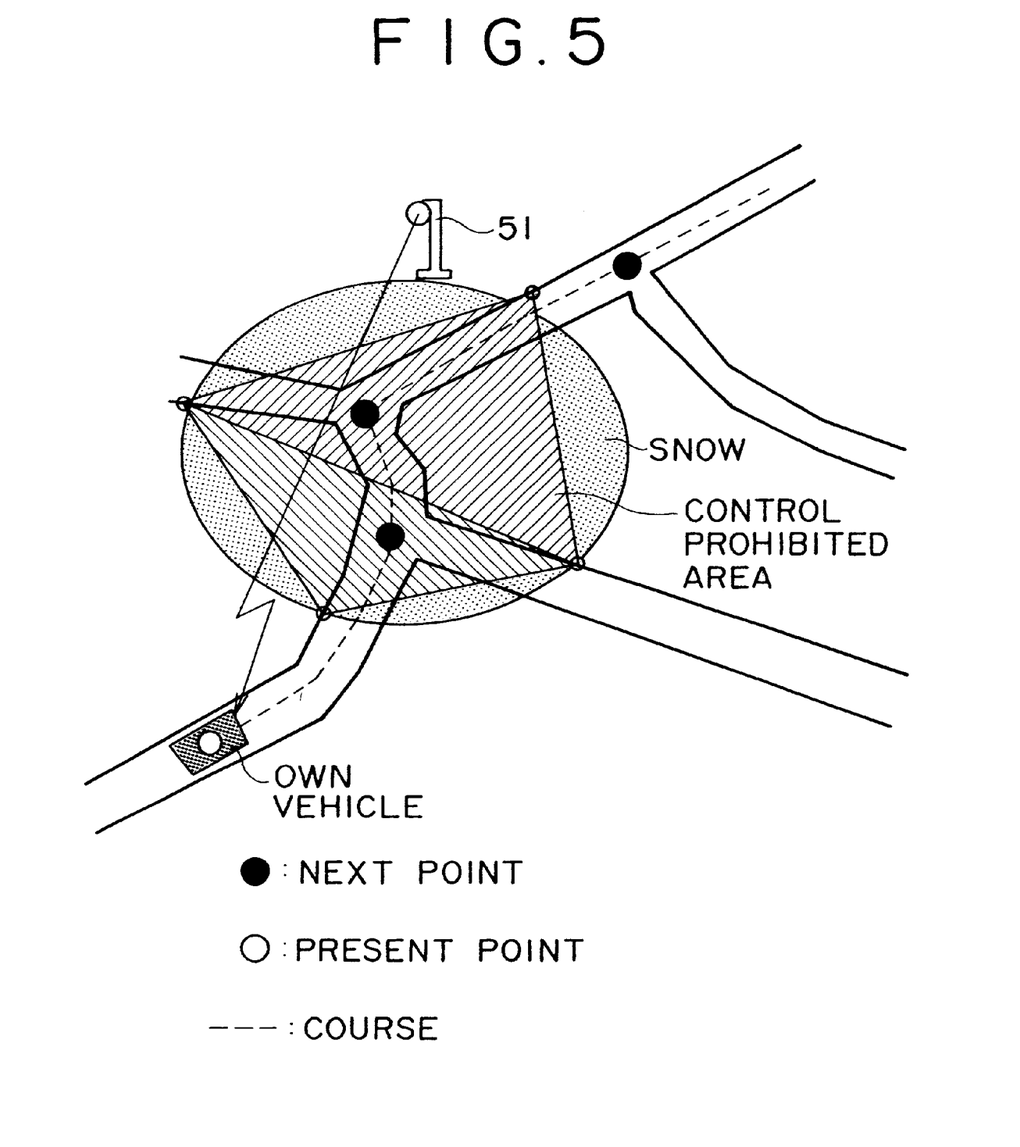
FIG. 5 is an explanatory drawing of a method of recognizing an area where vehicle following-up control is prohibited.
Figure 10:
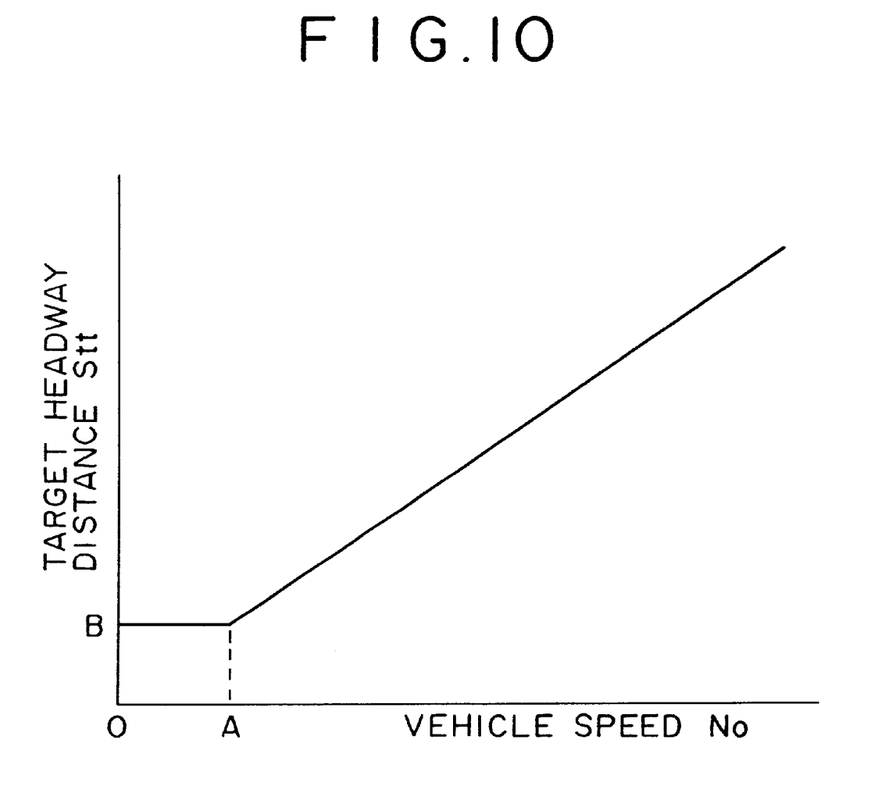
FIG. 10 is an explanatory drawing of target vehicle-to-vehicle distance data when it is fine.
Figure 11:
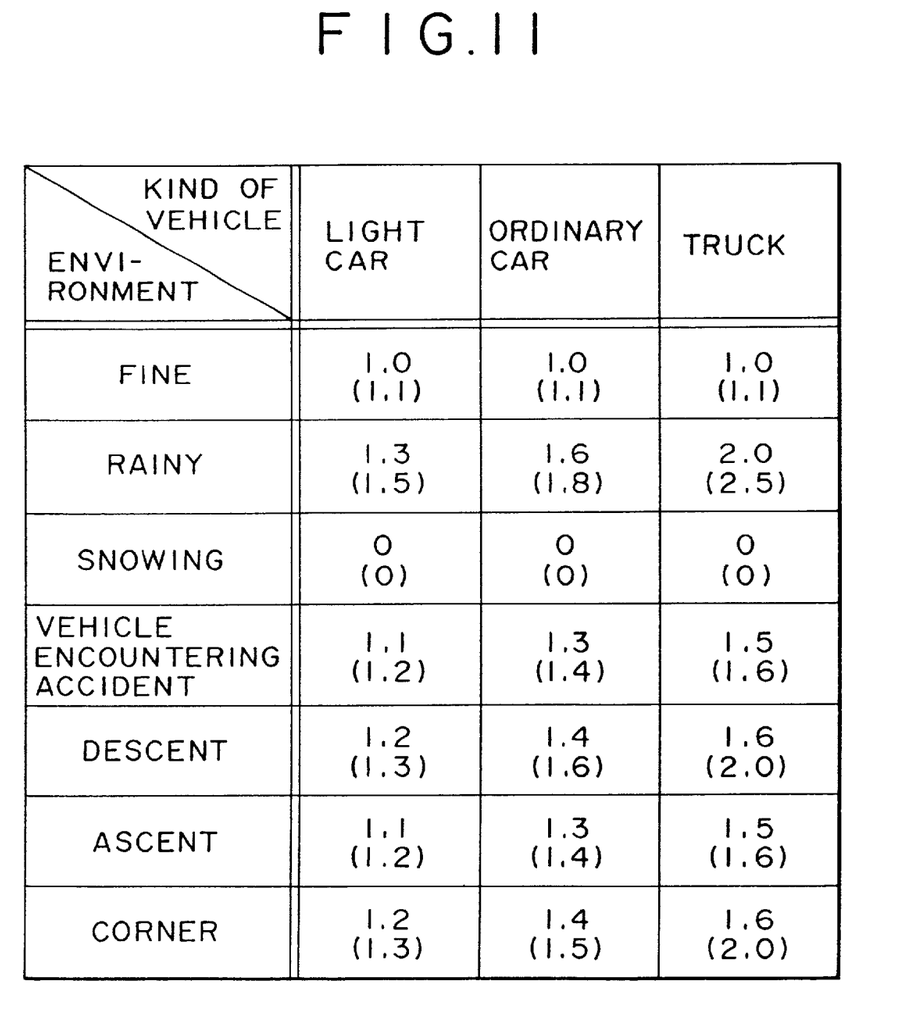
FIG. 11 is an explanatory drawing of correction factor of vehicle-to-vehicle distance when traveling environment is changed.

FIG. 5 illustrates a method of recognizing a follow-up control prohibited area. The white circle indicates the point at which the own vehicle is present now, black circles indicate the points at which the own vehicle will arrive from now on, and the broken line indicates the course to be taken. At the point where the own vehicle is now present, a point in front is detected beforehand and it is determined whether or not the vehicle follow-up control is allowed there. To make the determination, the CD-ROM data shown in FIG. 6 is used. In the CD-ROM, there are stored a plurality of the points related to the road, and in each of the point, there are stored the relevant road conditions. By having the areas in which control by headway distance is prohibited stored in some of them, control by headway distance can be restricted according to the road environments ahead of the vehicle and, thereby, safety during the control by distance between vehicle can be secured. Referring to FIG. 5, an infrastructure 51 is detecting the traveling environments, and if it is snowing at the next point (half-tone dot meshed area), a signal of existence of an area where the control by headway distance is prohibited is transmitted from the infrastructure 51. In this case, the signal of the prohibited area is sent to the rewrite means 41 and the traveling restricted area is set in storage means within the setting means 33. The setting of the traveling restricted area is carried out according to the above-described coordinate axes (oblique-lined portion). In this way, control by headway distance is prohibited on a slippery road. Where a road is slippery, i.e., the coefficient of friction between tires and the road surface is low, it is difficult to exercise the control by distance between vehicle because the acceleration/deceleration performance of a vehicle widely varies with such conditions as the tire groove shape, presence or absence of ABS (Antilock Brake System), and presence or absence of traction control. The invention allows control by headway distance to be prohibited on a slippery road and safety traveling to be secured. While the above description is about making a decision whether or not control by headway distance is prohibited according to changes in the road environments ahead, the control system can also change the traveling conditions according to the changes in the road environments. FIG. 10 shows data of target distances between vehicles when it is fine and FIG. 11 shows correcting coefficients of the headway distance when traveling environments are changed. In FIG. 10, the target headway distance Stt varies with the vehicle speed No. For low vehicle speeds in the range from 0 to the speed at the point A, the target headway distance is set at a constant value B. Considering the situation in following up a vehicle ahead in a traffic snarl, it is designed so that the vehicle follows a vehicle ahead with a constant distance therebetween to thereby secure safety driving and prevent the driver from being frightened in a traffic snarl. For car velocities higher than that at the point A, the target distance to a car ahead is increased with increase in the vehicle speed to keep a safety distance between the vehicles that corresponds to the vehicle speed. The target distance to a car ahead is set under the condition that it is fine and the road is paved, i.e., the coefficient of friction between the road and tires is the highest. However, since vehicle traveling environments change from time to time, it is essential to set the safety target headway distance according to the changes in the environments. In FIG. 11, the correcting coefficient K of a distance to a vehicle ahead is set according to traveling environments and the type of the vehicle. Items of possible environments include fine, rainy, snowy, presence of a vehicle encountering an accident, a descent, an ascent, a corner, and the like. Types of vehicles may be classified by weight, i.e., they may be classified by such types as a light car, an ordinary car, a truck, etc. If traveling in rainy is taken for example, since the coefficient of friction between a tire and a road surface in rainy is lower than that when it is fine, the target headway distance Stt, which is applicable in fine and used as a reference value, is multiplied by the above described correcting coefficient K so as to increase the target headway distance. Thereby, even if the degree of grip of the car ahead is greater than that of the own vehicle on the following side (which depends on the degree of wear of the tires, difference in the tire width, difference in the tire rubber quality, difference in the brake units: presence or absence of the ABS, etc.), it is made possible for the own vehicle to make deceleration safely when the vehicle in front decelerates. In snowy day, in which the coefficient of friction between a tire and a road surface is still lowered, the coefficient K is set at zero to stop control by headway distance. In a case where information about presence of a car encountering a traffic accident is received as infrastructural information from such a unit as a beacon, it is required to previously set the target headway distance at a higher value because it is quite possible that the car ahead abruptly decelerates. Since the decelerating performance of the own vehicle on the following side is lowered when it goes down a slope and deceleration of the vehicle ahead is increased when it goes up a slope, it is necessary to previously set the target distance between the vehicles at a higher value. The above descriptions were made as to correction of the target headway distance related to each of independent traveling environments. In reality, however, these individual traveling environments are combined together. In such a case, all of the correcting coefficients K are multiplied together to set a safety target headway distance. Where a visible-light camera, whose performance is lowered at night, is used, a decrease in its performance at night can be compensated for by replacing the value of each K with a value given in the parentheses thereunder in FIG. 11.

Figure 12:
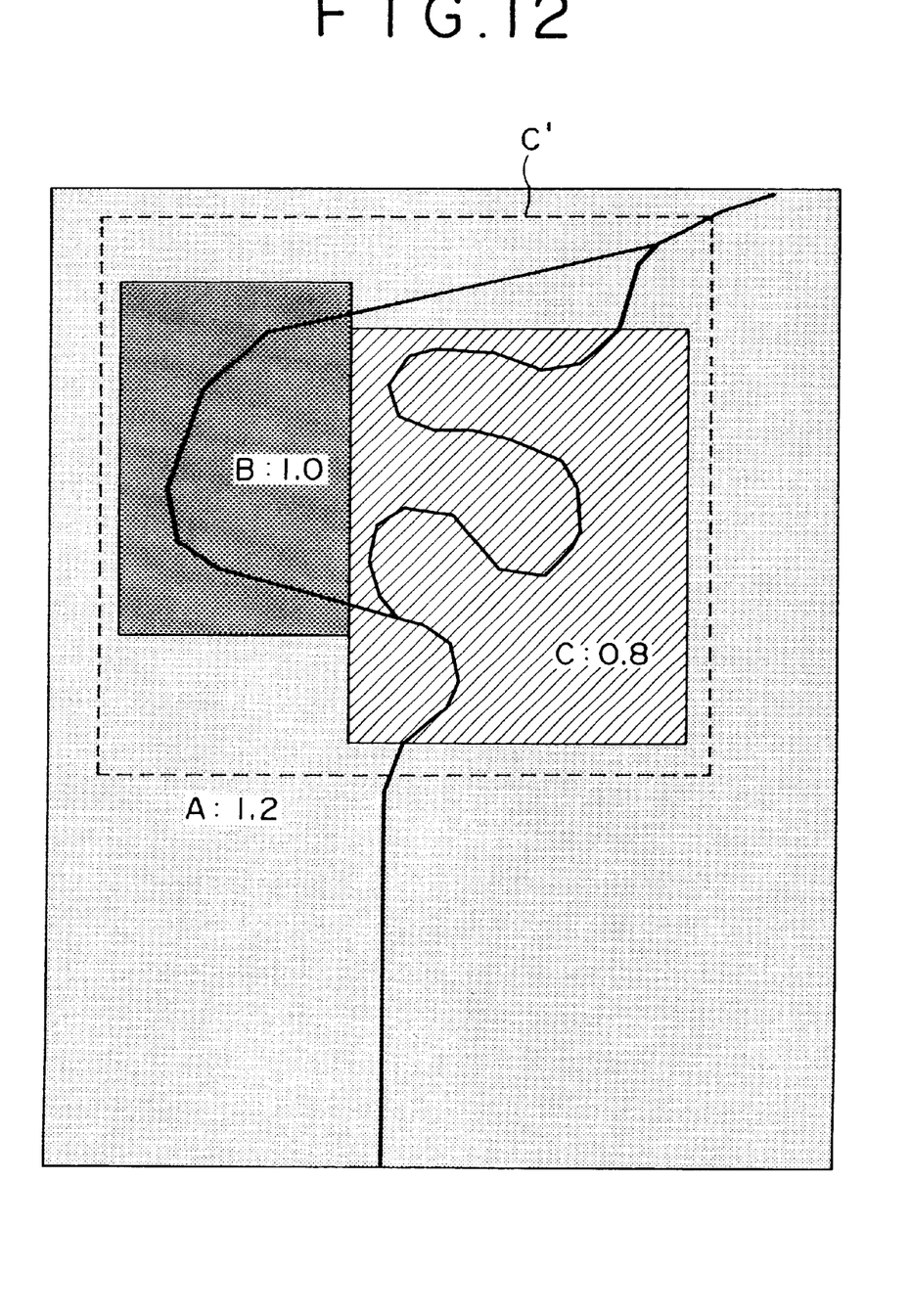
FIG. 12 is an explanatory drawing where the target correction factor of vehicle-to-vehicle distance is changed according to conditions in the traveling area.

FIG. 12 illustrates a case where the correcting coefficient of a target headway distance is changed according to configuration of the areas traveled. A solid line in FIG. 12 indicates a highway. In the area (A) where the road is substantially straight, the correcting coefficient K is set at as large a value as 1.2 to make the headway distance larger because the vehicle speed is high and little delay in traveling occurs even if another vehicle cuts in. Thereby, safety can be secured and the driver is given a sense of relief while the vehicle is driven at high speeds. In the gently curved area (B), the above mentioned target headway distance in fine is used. Further, in the sharply curved area (C), the vehicle travels at a medium speed and other vehicles may cut in one after another, resulting in a great delay in traveling, and therefore, it is required to make such a mode of control to shorten the headway distance. In this case, the correcting coefficient is set at a value less than 1 to exercise control to shorten the target distance to a vehicle ahead. However, this is somewhat problematic in terms of safety, and therefore, it is better that the setting to decrease the target distance to a car ahead is carried out by the driver. Otherwise, it is required to previously give the driver an audio message indicating that the vehicle will soon enter the C area. As special conditions to be considered other than those mentioned above, such as presence of a tunnel, presence of an urban district, being at nighttime, being at daytime, being at rush hours etc. can be mentioned. Of course, it is possible to set a correcting coefficient applicable to each area or time zone, the same as in the cases described above (for example, A: 0.8, B: 0.6 and C: 0.6 may be applied to a period of traffic snarl). Especially, detection of the daytime is possible from lights being ON/OFF and information about environmental conditions in rush hours can be obtained from infrastructure. In addition, an area traveled can be modified. Namely, taking the area C for example, the area traveled can be expanded from (C) to (C') in rush hours when traffic congestion tends to occur to thereby cope with other vehicles frequently cut in.

What is claimed is:

1. An own vehicle comprising
   an engine;
   a brake; and
   a control apparatus having means for storing map information;
   wherein said control apparatus controls said engine or said brake on the basis of the distance from a vehicle in front, and
   said own vehicle on this side, while the same is in an area, changes the mode of said control when said vehicle is recognized to have reached an area defined by at least three points on a map of the stored information.

2. An own vehicle according to claim 1, further comprising a speed change gear, wherein
   said control apparatus controls said engine, said brake, or said speed change gear on the basis of the distance from said vehicle in front.

3. An own vehicle according to claim 1, wherein
   said control apparatus controls said engine, said brake, or said speed change gear on the basis of the distance from said vehicle in front and the speed of said own vehicle.

4. An own vehicle according to claim 1, wherein
   said control is such a mode of control to cause the distance from said vehicle in front to approach a constant value, and
   said change operation is to stop said control.

5. An own vehicle according to claim 1, wherein
   said control is such a mode of control to cause the distance from said vehicle in front to approach a constant value, and
   said change operation is to change the amount controlled in said control.

6. An own vehicle according to claim 1,
   further comprising a detector of the position of said own vehicle, wherein
   said own vehicle determines whether the own vehicle is within said area or not on the basis of the output of said detector.

7. An own vehicle according to claim 1, wherein
   said own vehicle changes the mode of said control again when said own vehicle leaves said area.

8. An own vehicle according to claim 7, wherein
   the mode of control before reaching said area and the mode of control after leaving said area are the same.

9. An own vehicle comprising:
   an engine;
   a brake; and
   a control apparatus having means for storing map information;
   wherein said control apparatus controls said engine or said brake on the basis of the distance from a vehicle in front, and
   an own vehicle changes the mode of said control on the basis of information about the road ahead of said own vehicle when said vehicle is recognized to have reached an area defined by at least three points on a map of the stored map information.

10. An own vehicle according to claim 9, further comprising a speed change gear, wherein
    said control apparatus controls said engine, said brake, or said speed change gear on the basis of the distance from said vehicle in front.

11. An own vehicle according to claim 9, wherein said control apparatus controls said engine, said brake, or said speed change gear on the basis of the distance from said vehicle in front and the speed of said own vehicle.

12. An own vehicle according to claim 9, wherein
    said control is such a mode of control to cause the distance from said vehicle in front to approach a constant value, and
    said change operation is to stop said control.

13. An own vehicle according to claim 9, wherein
    said control is such a mode of control to cause the distance from said vehicle in front to approach a constant value, and
    said change operation is to change the amount controlled in said control.

14. An own vehicle according to claim 1, characterized in that
    said area or information of said road is obtained from at least one of an image of a view in front, a navigator, or information received from outside.

15. An own vehicle travel controlling apparatus mounted on a vehicle, comprising means for storing map information, apparatuses configured to control an engine or a brake of said vehicle on the basis of the distance from a vehicle in front and to change the mode of said control on the basis of information about the road ahead of said vehicle when said vehicle is recognized to have reached an area defined by at least three points on a map of the stored map information.

* * * * *